United States Patent
VanSickel

(10) Patent No.: US 12,058,194 B2
(45) Date of Patent: Aug. 6, 2024

(54) MULTIMODAL TRANSFER BETWEEN AUDIO AND VIDEO STREAMS

(71) Applicant: Sling TV L.L.C., Englewood, CO (US)

(72) Inventor: Seth VanSickel, Englewood, CO (US)

(73) Assignee: Sling TV L.L.C., Englewood, CO (US)

( * ) Notice: Subject to any disclaimer, the term of this patent is extended or adjusted under 35 U.S.C. 154(b) by 0 days.

(21) Appl. No.: 16/854,493

(22) Filed: Apr. 21, 2020

(65) Prior Publication Data

US 2021/0329053 A1    Oct. 21, 2021

(51) Int. Cl.
H04L 65/75    (2022.01)

(52) U.S. Cl.
CPC .................................. H04L 65/764 (2022.05)

(58) Field of Classification Search
None
See application file for complete search history.

(56) References Cited

U.S. PATENT DOCUMENTS

| | | | |
|---|---|---|---|
| 11,055,785 B1* | 7/2021 | Lundsgaard | G06Q 40/00 |
| 11,330,029 B2* | 5/2022 | VanBlon | H04L 65/1083 |
| 2009/0042551 A1* | 2/2009 | Tsai | H04L 65/70 |
| | | | 455/418 |
| 2010/0042235 A1* | 2/2010 | Basso | H04N 21/2389 |
| | | | 700/94 |
| 2011/0067075 A1* | 3/2011 | Barry | H04L 12/2829 |
| | | | 725/109 |
| 2011/0283334 A1* | 11/2011 | Choi | H04L 67/148 |
| | | | 725/148 |
| 2013/0204825 A1* | 8/2013 | Su | G06N 5/02 |
| | | | 706/46 |
| 2013/0208184 A1* | 8/2013 | Castor | H04N 21/4126 |
| | | | 348/552 |
| 2014/0334381 A1* | 11/2014 | Subramaniam | H04W 4/00 |
| | | | 370/328 |
| 2017/0339226 A1* | 11/2017 | Hensgen | H04L 12/2834 |
| 2018/0262793 A1* | 9/2018 | Lau | H04N 21/43076 |
| 2018/0350180 A1* | 12/2018 | Onischuk | G07C 13/00 |
| 2019/0007745 A1* | 1/2019 | Lewis | H04L 67/55 |
| 2019/0208270 A1* | 7/2019 | Bates | H04N 21/43615 |
| 2020/0349481 A1* | 11/2020 | Prasad | G06N 20/10 |
| 2020/0359154 A1* | 11/2020 | Brown | H04R 29/001 |
| 2020/0402311 A1* | 12/2020 | Trim | G06Q 30/02 |
| 2021/0120277 A1* | 4/2021 | Nonnenmacher | H04N 21/44008 |
| 2021/0122292 A1* | 4/2021 | Javeri | H04L 12/1845 |

(Continued)

*Primary Examiner* — Dhairya A Patel
(74) *Attorney, Agent, or Firm* — Perkins Coie LLP

(57) ABSTRACT

The present disclosure is directed to systems and methods for multimodal transition among devices connected to a plurality of different networks. A device may be presenting a multimedia item in a first mode (e.g., an audiovisual mode) on a first device. A transition event may occur, prompting the systems and methods described herein to initiate a transition request to transition the multimedia item from a first device to a second device. The second device may be analyzed to determine the constraints of the device (e.g., storage, hardware/software, connectivity strength, etc.). The first mode of the multimedia item may also be analyzed. Based on the analysis of the multimedia item in the first mode and the second device, the multimedia item may be converted from a first mode to a second mode (e.g., an audio-only mode of the multimedia item) and subsequently displayed on the second device.

20 Claims, 6 Drawing Sheets

(56) References Cited

U.S. PATENT DOCUMENTS

| | | | |
|---|---|---|---|
| 2021/0342398 A1* | 11/2021 | Snyder | G06F 16/287 |
| 2022/0085660 A1* | 3/2022 | Glover | H02J 50/20 |
| 2022/0107690 A1* | 4/2022 | Dormody | H04N 21/4524 |

* cited by examiner

MULTIMODAL TRANSFER BETWEEN AUDIO AND VIDEO STREAMS

TECHNICAL FIELD

The present disclosure is related to the fields of multimedia playback, streaming, and handoffs/handovers.

BACKGROUND

In modern multimedia systems, a user may be watching a multimedia item (e.g., a video) on a device (e.g., a television) and then move away from that device for a variety of reasons. When a user moves away from that device, there is a period of interruption to the multimedia stream. The interruption becomes more pronounced when the user desires to continue consuming the multimedia stream content. Currently, a user who wishes to continue consuming the multimedia stream content on a different device must typically navigate to a particular application, select the multimedia item that the user was previously consuming on the other device, and then either restart the multimedia item from the beginning or manually move an indicator in a multimedia progress bar to an approximate position of where the user previously left off. This oftentimes results in the user resuming a multimedia item at a time position that is not the same as where the user previously left off on the other device, causing the user to either skip over multimedia content or replay multimedia content previously consumed.

In other examples, a user may wish to resume consuming a multimedia item on a second device, but the second device may not be equipped to handle the format in which the multimedia item was streaming on the first device. For instance, a user may be viewing a television show through a streaming service on a television that displays 4K video quality. When the user wants to continue consuming the content of that video on a mobile device, the mobile device may not be equipped to display 4K, or in other scenarios, the data usage plan for the mobile device may not support streaming a video in 4K. As a consequence of this incompatibility between devices, there is an interruption of the multimedia content among devices.

As such, there is an increased need to seamlessly transition multimedia streams among different devices while minimizing the amount of interruption, so that a user may transition among multiple devices connected to different networks with little to no interruption of the multimedia content. Furthermore, an increased need exists to seamlessly transition multimedia content among devices based on device constraints (e.g., hardware/software constraints, data usage plan constraints, etc.), so that interruption to a multimedia stream is minimized.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
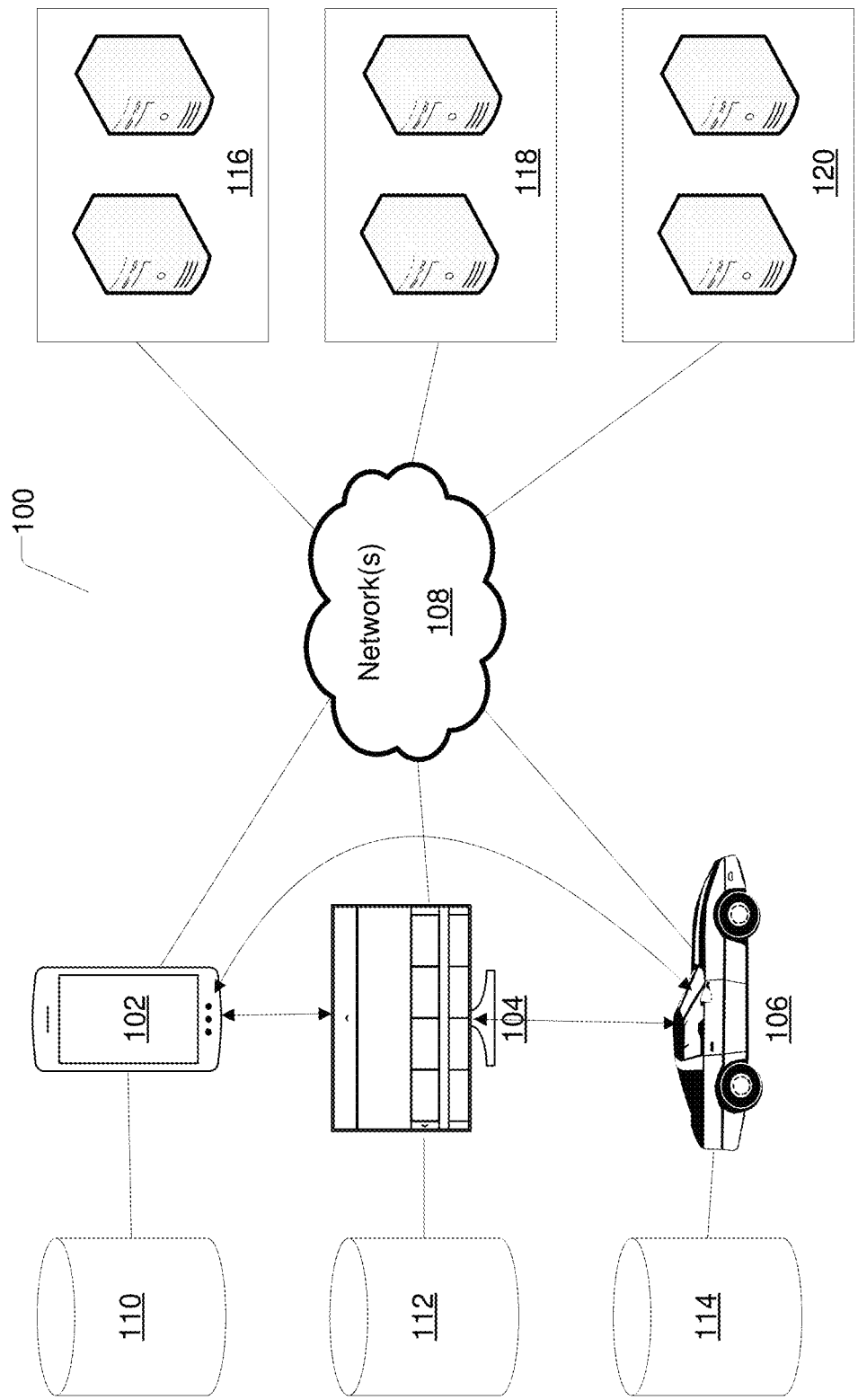
FIG. 1 illustrates an example of a distributed system for multimodal transfer between audio and video items, as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed to systems and methods for multimodal transfer between audio and video streams among a plurality of devices and networks that allow for the seamless transition of multimedia content from one device to another device. The systems and methods presented herein are directed to allowing users to continue consuming multimedia content between devices. For example, a user may transition from consuming multimedia content on a television to consuming the same multimedia content in a vehicle. The multimedia content consumed on the television may be displayed in first mode, wherein the multimedia content contains both audio and visual components. When the user transitions to the car, the multimedia content that was presented on the television may be transferred to the car in a second mode, wherein the second mode of the multimedia content contains only an audio component.

The systems and methods described herein minimize the interruption of consuming multimedia content when switching between devices. Additionally, the systems and methods described herein increase the efficiency of multimedia data transfer between devices, thereby reducing bandwidth and network overload. For instance, multimedia content that is transferred from a television streaming a 4K video to a mobile device streaming only the audio component of the 4K video may be compressed according to at least one compression algorithm. The compression may occur on the transmitting device prior to the transfer to reduce network bandwidth and overload. In other examples, the compression may occur on the receiving device post-transfer, thereby reducing storage usage of the multimedia content on the receiving device and subsequent network bandwidth usage of the streaming multimedia items.

In yet other embodiments, the transition between devices may occur over the same or different networks. For instance, a television device may be receiving a multimedia item over a cable broadcast from a cell and/or radio tower. When a transition request is received to transfer the multimedia item from the television device to a mobile device, the mobile device may be connected via satellite signal and/or Wi-Fi. The transition of the multimedia item from the television device (operating on one type of network) to the mobile device (operating on another type of network) is able to happen without interruption, according to the systems and methods described herein. In some instances, a broadcast to Wi-Fi and/or cellular converter may be used for the transition; in other instances, the systems and methods described herein may be able to capture the exact period of transition from the television device, transfer that information to the mobile device, and resume the multimedia item from a different network source (e.g., streaming over Wi-Fi) at the exact period of transition. Accordingly, the systems and methods described herein are compatible with transferring a multimodal item across a plurality of communication networks and devices operating on those networks. For example, there is a particular need for a seamless transition of consuming a multimedia item from a television device broadcasting the multimedia item over a broadcast network to a mobile device streaming the same multimedia item over a Wi-Fi and/or cellular network, and vice versa.

The majority of users who wish to transition between devices and continue consuming the multimedia content are forced to manually make this transition. For instance, a user watching an online video on a computer who wishes to transition to a vehicle with an audio-only radio is typically forced to manually reload the video inside the vehicle, configure the settings of the device to play audio only, drag the video progress indicator to an approximate point where the user previously left off, and then press play (hoping that the multimedia content begins playing in generally the same spot where the user left off). To address these issues, the systems and methods described herein provide for multimodal transitions without interruption. For instance, the systems and methods described herein may be configured to recognize when the user transitions to a different device but wishes to continue consuming the multimedia content. The systems and methods described herein may be equipped to recognize patterns and routines related to the transitions; for instance, during weekday mornings, a user may consume multimedia content on a television device until 7:00 am. At 7:00 am, the user transitions to a vehicle to drive to work but wishes to continue consuming the multimedia content previously being consumed on a television device. Over time, the systems and methods may recognize this pattern and preemptively prepare for such a multimodal transition, making the transition between devices more seamless and less interruptive for the user.

Accordingly, the present disclosure provides a plurality of benefits including but not limited to: enabling less interruptive and more seamless transitions of multimedia content among devices operating on similar or different networks; reducing network bandwidth; reducing network overload; and reducing memory usage on devices.

FIG. 1 illustrates an example of a distributed system for multimodal transfer between audio and video items, as described herein. Example system 100 presented is a combination of interdependent components that interact to form an integrated whole for multimodal transfer of multimedia content among devices. Components of the system may be hardware components or software implemented on, and/or executed by, hardware components of the systems. For example, system 100 comprises client devices 102 and 104, vehicular device 106, local databases 110, 112, vehicular database 114, network(s) 108, and server devices 116, 118, and/or 120.

Client devices 102 and 104 and vehicular device 106 may be configured to communicate with one another across network(s) 108, such as a Wi-Fi or cellular network. In other example aspects, client devices 102 and 104 and vehicular device 106 may communicate among one another using short-range wireless communication standards, such as Bluetooth and/or Bluetooth Low Energy. Client devices 102 and 104 and vehicular device 106 may receive and transmit information among each other relating to device information and multimedia content transmissions, among other data. In other examples, a devices may comprise mobile phones, tablets, laptops, computers, televisions, smart home devices, vehicles, earphones, earbuds, smart watches, VR/AR glasses, head-mounted display, among other devices capable of presenting multimedia content.

In aspects, a client device and/or vehicular device, such as devices 102, 104, and 106, may have access to one or more multimedia content repositories. Such repositories may be in the form of an application on a device, a DVR, or other storage mechanism for storing multimedia content. The multimedia content data sources may be local to, or external to, the client devices and/or vehicular device. The data related to multimedia content may include, for example, video files, audio files, metadata associated with the multimedia content (e.g., display quality, audio quality, frame rate, etc.).

Client devices 102 and 104 and vehicular device 106 may also be configured to receive and store data related to transition events. A transition event may be an event when a user switches from a first device to a second device and continues consuming the same multimedia content. During this transition period, client devices 102 and 104 and vehicular device 106 may communicate with one another via network(s) 108. Transmissions related to device information may be shared. Transmissions related to the multimedia content may also be shared.

For instance, a user may be consuming certain multimedia content on client device 102 (e.g., mobile phone). Client device 102 may be streaming a certain multimedia item via a cellular network. Upon a transition event from client device 102 to client device 104, client device 102 may initiate a transition action and transmit information to client device 104 via network(s) 108 and/or short-range communication network(s) like Bluetooth. Client device 104 may receive the information from client device 102, which may include the location within the multimedia content at which the user initiated the transition (i.e., where the user left off). Because client device 104 may not be connected to the same cellular network as client device 102, client device 104 may retrieve the same multimedia content from a different source. For instance, rather than streaming the multimedia content over network(s) 108, client device 104 may access the multimedia content through a DVR storage repository, such as local storage 112 and/or cloud storage on servers 116, 118, and/or 120. The multimedia content may be transmitted from cloud storage on servers 116, 118, and/or 120 via network(s) 120 to client device 104.

Additionally, a user may have initially been consuming the multimedia content on client device 102 via audio stream only (no video). Upon transition to client device 104, the multimedia content may now be consumed both audibly and visually. Information related to the device capabilities of client device 104 may be considered during the transition process. For instance, client device 104 may be a stationary device with the ability to display visual content at 4K resolution (3.g., 3840×2160 pixels or 4096×2160 pixels). Client device 102 may be a mobile device that is most frequently used when the user is in motion, usually indicating that an audio-only stream is appropriate (as compared to an audio plus visual stream).

In some aspects, the data that is captured by client devices 102 and 104 and vehicular device 106 may be provided to one or more machine-learning (ML) models. A model, as used herein, may refer to a predictive or statistical utility or program that may be used to determine a probability distribution over one or more character sequences, classes, objects, result sets or events, and/or to predict a response value from one or more predictors. A model may be based on, or incorporate, one or more rule sets, machine learning, a neural network, or the like. In an example, the ML models may be located on the client device, vehicular device, a server device, a network appliance (e.g., a firewall, a router, etc.), or some combination thereof. The ML models may process the data to determine whether the devices are typically stationary or in-motion, where a user may utilize the device, at what time a device may utilized, the type of content most frequently consumed on that device, and other relevant data that may aid in the furthering seamless transitions of multimedia content among devices.

For example, client device 104 may be a big-screen television device located in a user's living room. Over time, the systems and methods described herein may identify that client device 104 is a stationary device that has high audiovisual capabilities (e.g., displaying video in 4K resolution, outputting audio at Hi-Res quality, etc.). Furthermore, the systems and methods described herein may recognize patterns associated with the use of client device 104. For instance, client device 104 may be used Mondays through Fridays between 6:30 and 7:30 am and in the evenings from 7:00 pm to 9:00 pm. Following the use of client device in the mornings at 7:30 am, the user typically moves from the living room area to the garage, so the user can drive his/her car (vehicular device 106) to work. In some example aspects, the user's change of location from the living room to the garage may cause a transition request from client device 104 to vehicular device 106, causing the multimedia content being consumed from client device 104 to be played in vehicular device 106. Because vehicular device 106 may not be equipped with a screen (or because it may be defined as a vehicular device for safety reasons), the multimedia content being consumed on client device 104 may be played in vehicular device 106 through an audio-only mode, rather than an audiovisual mode. Over time, the systems and methods described herein may analyze a user's patterns (e.g., location history, time, type of consumption of multimedia content on particular devices, etc.). As such, rather than the user's change of location triggering the transition request from client device 104 to vehicular device 106, a transition request may occur automatically based on machine-learned patterns at 7:30 am when the user frequently stops consuming multimedia content on client device 104 and transitions to vehicular device 106. Such smart transitions may result in less interruption of the consumption of multimedia content when transitioning between devices.

In some aspects, features of the user's behavior may be used to train the one or more ML models. For example, a set of labeled and/or unlabeled data may be used to train an ML model to identify device characteristics, location characteristics, and multimedia content characteristics that are sufficiently similar to the data used to train the model. The training may include the use of one or more supervised or unsupervised learning techniques, including but not limited to pattern recognition techniques. The trained ML model may be deployed to one or more devices. As a specific example, an instance of a trained ML model may be deployed to a server device and to a client device. The ML model deployed to a server device may be configured to be used by the client device and/or vehicular device when, for example, the client device and/or vehicular device is connected to the Internet. Conversely, the ML model deployed to the client device may be configured to be used by the client device and/or vehicular device when, for example, the client device and/or vehicular device is not connected to the Internet. In such an example, the ML model may be locally cached by the client device and/or vehicular device.

Figure 2:
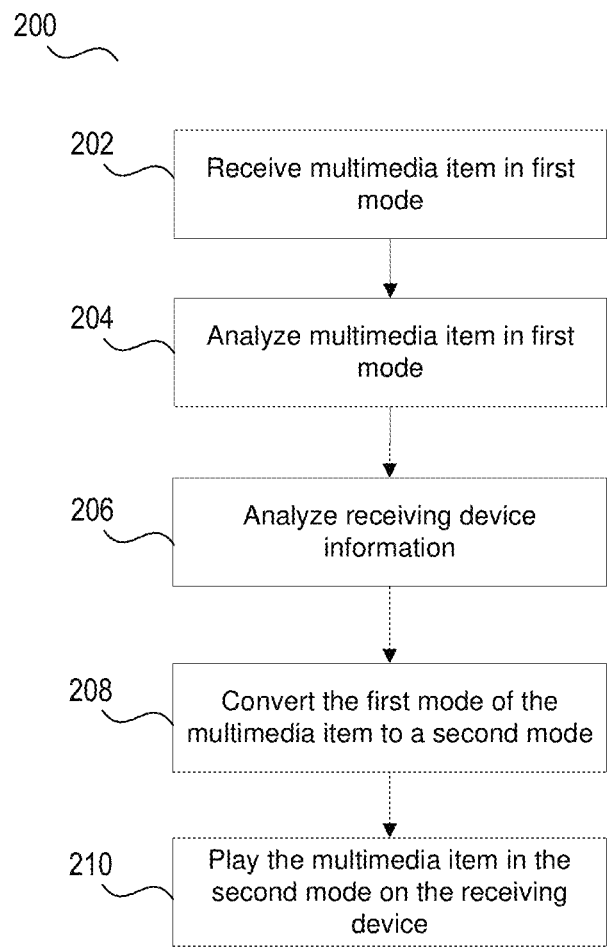
FIG. 2 illustrates an example method for multimodal transfer between audio and video items from the perspective of the receiving device, as described herein.

FIG. 2 illustrates an example method for multimodal transfer between audio and video items from the perspective of the receiving device, as described herein. Method 200 begins with step 202, receiving multimedia item in first mode. A multimedia item may be any audio, visual, and/or audiovisual item (e.g., streaming show, broadcast show, recorded show, song, Internet video, podcast, educational track, etc.). A first mode of a multimedia item may comprise a certain format of the multimedia item. For instance, a multimedia item may be presented in both audio and visual format. In other examples, the multimedia item may be presented only in audio format or only in visual format. In yet other examples, different visual and audio qualities may be presented. A first mode of a multimedia item may be the initial format in which a multimedia item is presented. For example, client device 104 (television) may present a multimedia item in a first mode that consists of both audio and visual features. Upon a transition request from client device 104 to vehicular device 106, the multimedia item may be presented in vehicular device 106 in a second mode that may consist of audio only.

At step 204, the multimedia item may be analyzed in the first mode. At step 204, the first mode of the multimedia item may be identified by the receiving device and determined to have particular audio and visual characteristics. Such a determination may comprise an analysis of the metadata of the multimedia item. In some examples, an inventory of the multimedia item characteristics in the first mode may be identified and stored.

At step 206, the receiving device information may be analyzed. Such information may comprise device characteristics and constraints. For example, a device characteristic may comprise whether the device has a visual display and, if so, the display capabilities of the display (e.g., maximum resolution, color output, frames per second, etc.). In another example, a device characteristic may comprise whether the device has an audio output capability and, if so, the audio capabilities (e.g., external speakers, headphone input, type of input, Hi-Res audio capability, etc.). In yet another example, a device characteristic may comprise a user data plan. For instance, a device that is connected to Wi-Fi may have a greater bandwidth capability to visually display a multimedia item at a higher resolution. However, a device that is connected to a cellular network with a constraint on data usage (based on a user's plan) may not have the same bandwidth freedom as a device connected to Wi-Fi. In such situations, the multimedia item may be displayed in a lower resolution and/or presented in an audio-only mode, in order to conserve data usage, although the device hardware may be capable of displaying the multimedia item in a higher resolution.

Other information that may be received regarding the receiving device is the GPS location of the device, as well as information returned from a gyroscope sensor. For instance, if a receiving device is a mobile phone and located in an office, the systems and methods described herein may determine that presenting the multimedia content in an audio-only mode is most appropriate. However, if the mobile device is determined to be at the user's home, then presenting the multimedia content with in an audiovisual format may be most appropriate. Similarly, the information received form a gyroscope sensor may indicate that the device is in motion. If the device is in motion, the systems and methods described herein may determine that presenting the multimedia content in an audio-only format is most appropriate, since a device in motion may typically indicate that the user is walking, running, or engaging in some sort of activity that would likely preclude the user from consuming the multimedia content visually. In other instances, however, the gyroscope sensor may indicate the device is moving but the movement may be more indicative of a car, bus, or some form of transportation. Analyzing the GPS information of the receiving device in conjunction with the gyroscope indicator may determine that the user is riding on public transportation or in a taxi. In such a situation, presenting the multimedia content visually may be appropriate. However, if the device is located within the user's vehicle, then the systems and methods described herein may determine that the user is driving and present the multimedia content as audio-only, or in some cases, initiate a transition request to the vehicle (e.g., vehicular device 106).

In other examples, device information may comprise information received from third-party applications. For example, using a third-party application to book a rideshare may indicate to the systems and methods described herein that the user will not be driving a vehicle, although the gyroscope sensor may indicate the device is moving in accordance with a vehicle. As such, because the user will likely be a passenger in the vehicle, the third-party application information may cause the systems and methods described herein to present the multimedia content in an audiovisual format, (e.g., instead of audio-only if the user was operating the moving vehicle).

At step 208, the first mode of the multimedia item is converted to a second mode based on the analysis of the first mode of the multimedia item and the receiving device information. For example, a multimedia item may be initially received from a transmitting device. The transmitting device may have been a television capable of displaying pictures and colors in 4K resolution. The multimedia item first mode may be a high-quality audiovisual mode (e.g., 4K visual with Hi-Res audio). The receiving device may be a mobile phone. The mobile phone may also indicate that its visual capabilities are limited (e.g., the mobile phone may have a cracked screen and/or the screen is only capable of outputting a display in 480p). As such, the second mode that may be most appropriate is a lower-quality audiovisual mode or an audio-only mode. As described earlier, other device information may be analyzed to determine the most appropriate mode into which to convert from the first mode. In some instances, the first mode of the multimedia item may be of higher quality than the second mode; in other instances, the first mode of the multimedia item may be of lower quality than the second mode; in yet other instances, the first mode and the second mode may be the same. For example, a transition from a first device (e.g., personal laptop) to a similar second device (e.g., work laptop) may prompt the systems and methods described herein to continue presenting the multimedia content in the same mode as previously being consumed on the first device.

After the multimedia content is converted from the first mode into the second mode, the multimedia item may be presented in the second mode on the receiving device at step 210. For example, a user may have moved from the transmitting device (e.g., television) to a receiving device (e.g., vehicle). Where the user left off in the multimedia item on the television is where the user will be able to pick back up in the receiving device, thereby allowing the user to continue consuming a certain multimedia item while transitioning among devices.

Figure 3:
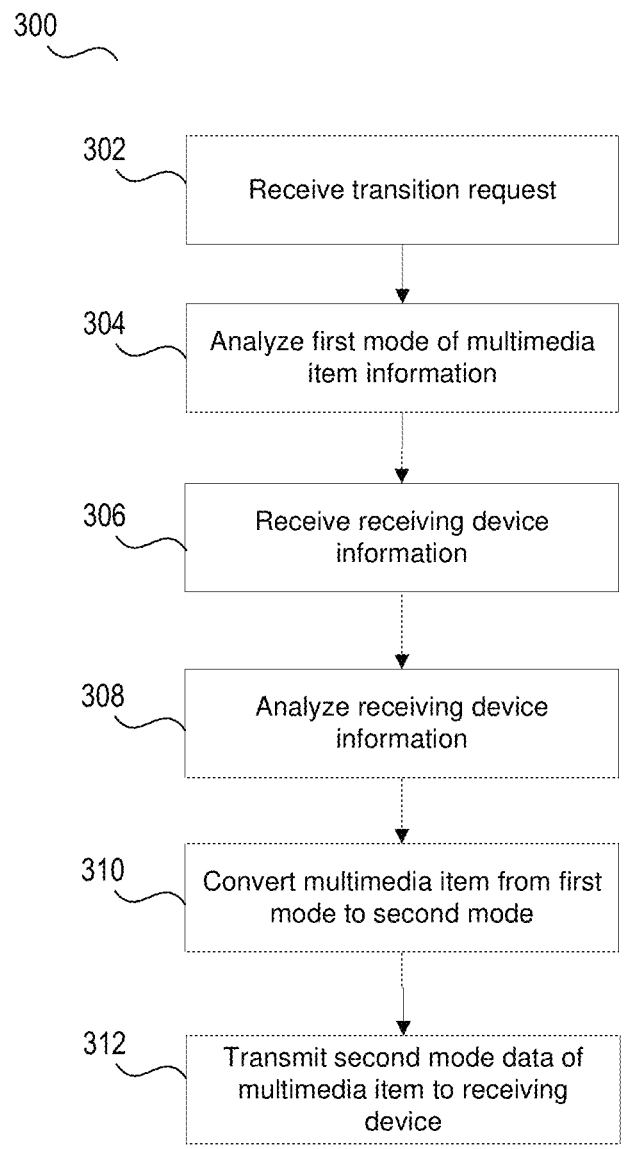
FIG. 3 illustrates an example method for multimodal transfer between audio and video items from the perspective of the transmitting device, as described herein.

FIG. 3 illustrates an example method for multimodal transfer between audio and video items from the perspective of the transmitting device, as described herein. Method 300 begins with step 302, receiving a transition request. A transition request may be initiated by a GPS location change of a particular device (e.g., a mobile phone that is commonly attached to a user's person), a calendar event, an AI-detected pattern by the systems and methods described herein, and a manual command (e.g., a button push, voice command, gesture, etc.), among other initiation actions. For example, the systems and methods described herein may have access to a user's calendar. An upcoming calendar event may cause the user to drive to a certain location. Prior to the time when the user is to leave for the event, a transition request may be initiated based on the calendar event. For instance, a user watching a television show may now need to transition to a vehicle to drive to an event. A transition event may occur between the television and the vehicle, so that the user can seamlessly go from watching the television show on the television to watching (and/or listening only) to the television show in the vehicle.

After a transition request is received at step 302, the first mode of the multimedia item is analyzed. As described with respect to FIG. 2, the information that may be analyzed at step 304 may comprise the visual features, audio features, and/or metadata associated with the multimedia item. For example, it may be determined that the source of the multimedia item is an Internet-streaming service, and the multimedia item is being presented on the transmitting device in a high-quality audiovisual format.

At step 306, the receiving device information may be received by the transmitting device, and at step 308, the receiving device information may be analyzed. Receiving device information may comprise information related to device constraints (e.g., both software and/or hardware), as well as data usage and/or user plan constraints.

At step 310, the multimedia item may be converted form a first mode into a second mode according to the analysis of the multimedia item information and the receiving device information. For example, a multimedia item being presented on the transmitting device may be presented in a high-quality audiovisual format (e.g., on a television). The receiving device information may indicate that the receiving device is not equipped to visually display a multimedia item but rather, can present the multimedia item in an audio-only format. Furthermore, the audio-only format of the receiving device may not support Hi-Res audio but support a lower quality audio standard. As such, the conversion process at step 310 takes these constraints into consideration when converting from the first mode to a second mode. In this instance, the high-quality audiovisual first mode of the multimedia item may be converted to a lower-quality audio-only second mode, so that it can continue to be presented to the user with minimal interruption as the user transitions between devices (i.e., moves from the living room watching a television to the driver seat of a vehicle).

After the multimedia item is converted from a first mode to a second mode, the data related to the second mode of the multimedia item may be transmitted to the receiving device at step 312. At step 312, at least one compression algorithm may be applied to the data of the second mode of the multimedia item to reduce network bandwidth, overload, latency, etc. In some examples, the data of the second mode of the multimedia item may comprise the multimedia item itself in the second mode format. In other examples, the data of the second mode of the multimedia item may comprise information about the formatting contours of the second mode of the multimedia item (i.e., transmitting information to the receiving device regarding how to present the multimedia item on the receiving device in the second mode).

The transition at step 312 may be completed over a plurality of different networks. For example, the transmitting device may be connected to a cellular network, whereas the receiving device may be connected to a Wi-Fi network. The transmission request may be configured to be passed initially through a cellular network and handed-off to a Wi-Fi network (e.g., where the transmission request is converted from cellular-compatible to Wi-Fi-compatible). Other network types that may be able to carry transmission requests sent at step 312 include broadband networks, satellite networks, Bluetooth, Bluetooth Low Energy, Zigbee, Z-Wave, Thread, and other methods/protocols of communication.

In other example scenarios, the systems and methods described herein may be equipped with at least one machine learning algorithm that is trained based on a user's actions in relation to transition events. For instance, the ML algorithm may learn that a user usually takes approximately three minutes to transition from the living room watching a television multimedia item to the driver seat of a vehicle. As such, when the ML algorithm determines that the user is transitioning from the living room to the vehicle, then a transition request may be initiated. In some instances, the user may be consuming a multimedia item that is streamed via an Internet streaming service. Additionally, the systems and methods described herein may predict (e.g., according to third-party data) that the user is about to drive along a route that has poor cellular reception and that the user does not currently have the multimedia item downloaded locally on his/her device (e.g., either a mobile phone device or a vehicular device). In such a scenario, the transition may comprise an automatic start of a download of the multimedia item onto the user's mobile device and/or vehicular device. The download will usually start from the transition point rather than the beginning of the multimedia item, so the user will be able to continue consuming the multimedia content in the vehicle where the user previously left off when consuming the multimedia item via a television device. The consuming of the multimedia item may continue even though the user may be traveling through areas of poor cellular reception (because the multimedia item was pre-emptively downloaded locally onto the user's mobile phone and/or vehicular device).

Figure 4:
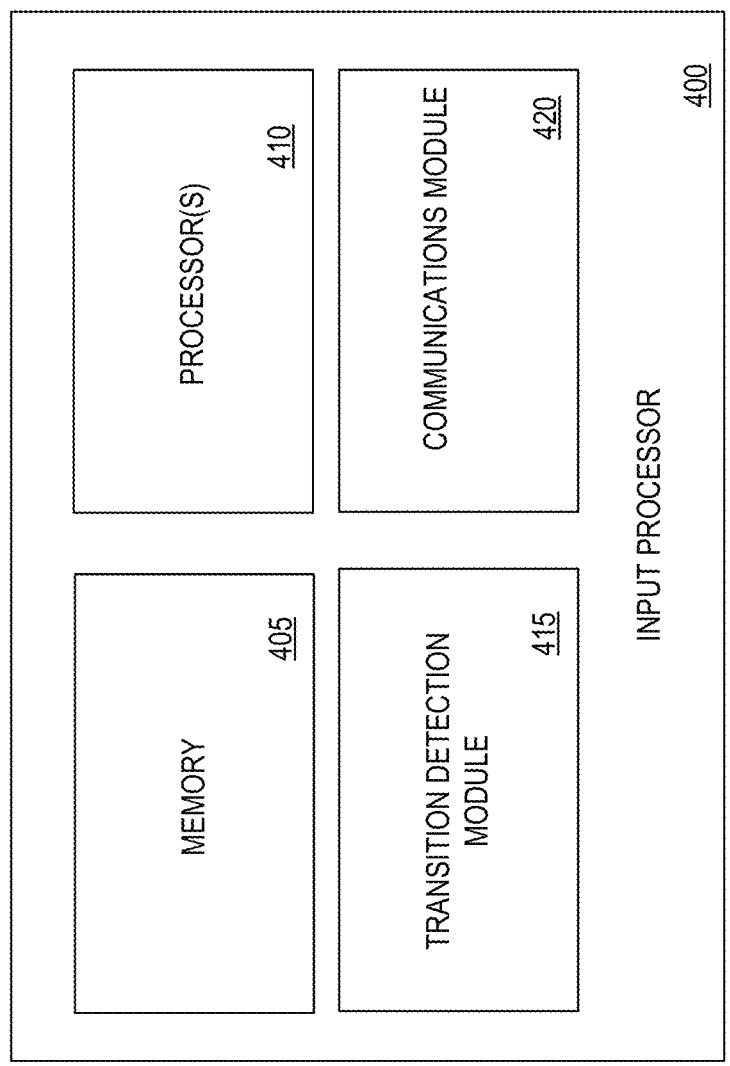
FIG. 4 illustrates an example input processor that is configured to implement the systems and methods described herein.

FIG. 4 illustrates an example input processor that is configured to implement the systems and methods described herein. Input processor 400 may be embedded within a client device (E.g., client devices 102, 104, and/or 106), remote web server device (e.g., devices 116, 118, and/or 120), set-top boxes, televisions, smart televisions, mobile devices, tablets, vehicles, laptops, computers, earphones/earbuds, and other devices capable of presenting multimedia content. The input processing system contains one or more data processors and is capable of executing algorithms, software routines, and/or instructions based on processing data provided by a variety of sources related to the selection of a multimedia item for recording (e.g., intelligently via a machine-learning algorithm and/or manually by a user). The input processing system can be a factory-fitted system or an add-on unit to a particular device. Furthermore, the input processing system can be a general-purpose computer or a dedicated, special-purpose computer. No limitations are imposed on the location of the input processing system relative to a client, remote web server device, mobile device, tablet, computer, laptop, television, set-top box, etc. According to embodiments shown in FIG. 4, the disclosed system can include memory 405, one or more processors 410, transition detection module 415, and communications module 420. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 405 can store instructions for running one or more applications or modules on processor(S) 410. For example, memory 405 could be used in one or more embodiments to house all or some of the instructions needed to execute the functionality of transition detection module 415 and communications module 420. Generally, memory 405 can include any device, mechanism, or populated data structure used for storing information. In accordance with some embodiments of the present disclosures, memory 405 can encompass, but is not limited to, any type of volatile memory, nonvolatile memory, and dynamic memory. For example, memory 405 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 405 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 405.

Transition detection module 415 may be configured to receive information related to transmitting and receiving devices, multimedia items, modes of format for multimedia items, and machine-learning data, among other information related to a multimodal transition between devices. For instance, transition detection module may be configured to receive GPS and gyroscopic information from a particular device. In other examples, transition detection module 415 may be outfitted with a GPS sensor and/or gyroscope sensor. In other examples, transition detection module may be configured to receive information from third-party applications, such as applications related to rideshare transport and/or a calendar. As an example, transition detection module may be configured to receive a calendar notification that a user needs to leave a certain location to get to an event. The information received by the transition detection module 415 from the calendar may case module 415 to detect a transition event and cause a transition among the implicated devices.

Transition detection module 415 may also be outfitted with at least one machine-learning engine that may utilize various machine learning algorithms to train at least one machine learning model, including but not limited to linear regression, logistic regression, linear discriminant analysis, classification and regression trees, naïve Bayes, k-Nearest neighbors, learning vector quantization, neural networks, support vector machines (SVM), bagging and random forest, and/or boosting and AdaBoost, among other machine learning algorithms. The aforementioned machine learning algorithms may also be applied when comparing input data to an already-trained machine learning model. Based on the identified and extracted features and patterns (e.g., of the user's actions in relation to multimodal transition events), machine learning engine 415 may select the appropriate machine learning algorithm to apply to the features to train the at least one machine learning model. For example, if the received features are complex and demonstrate non-linear relationships, then machine learning engine 415 may select a bagging and random forest algorithm to train the machine learning model. However, if the features demonstrate a linear relationship, then machine learning engine 415 may apply a linear or logistic regression algorithm to train the machine learning model.

Communications module 420 is associated with sending/receiving information (e.g., collected by transition detection module 415, such as device information, multimedia item information, machine-learning data, etc.) with other client devices, remote web servers, set-top boxes, mobile devices, tablets, computers, laptops, earbuds/earphones, vehicles, televisions, remotes, etc. These communications can employ any suitable type of technology, such as Bluetooth, WiFi, WiMax, cellular (e.g., 4G, 5G), LTE, single hop communication, multi-hop communication, Dedicated Short Range Communications (DSRC), or a proprietary communication protocol. In some embodiments, communications module 420 sends information received by transition detection module 315 to client device(s) 102, 104, and/or vehicular device 106, as well as remote server(s) 116, 118, and/or 120 via network(s) 108 and/or locally among one another using short-range communication protocols, such as Bluetooth or Bluetooth Low Energy. In other examples, communications module 420 may communicate a command to transition detection module 315 that is received from a client device, vehicular device, mobile device, smart home device, earphones/earbuds, tablet, laptop, computer, remote web server, remote, television, and/or other mechanism initiating a command to transition a multimedia item from one device to another device (i.e., multimodal transition).

Figure 5:
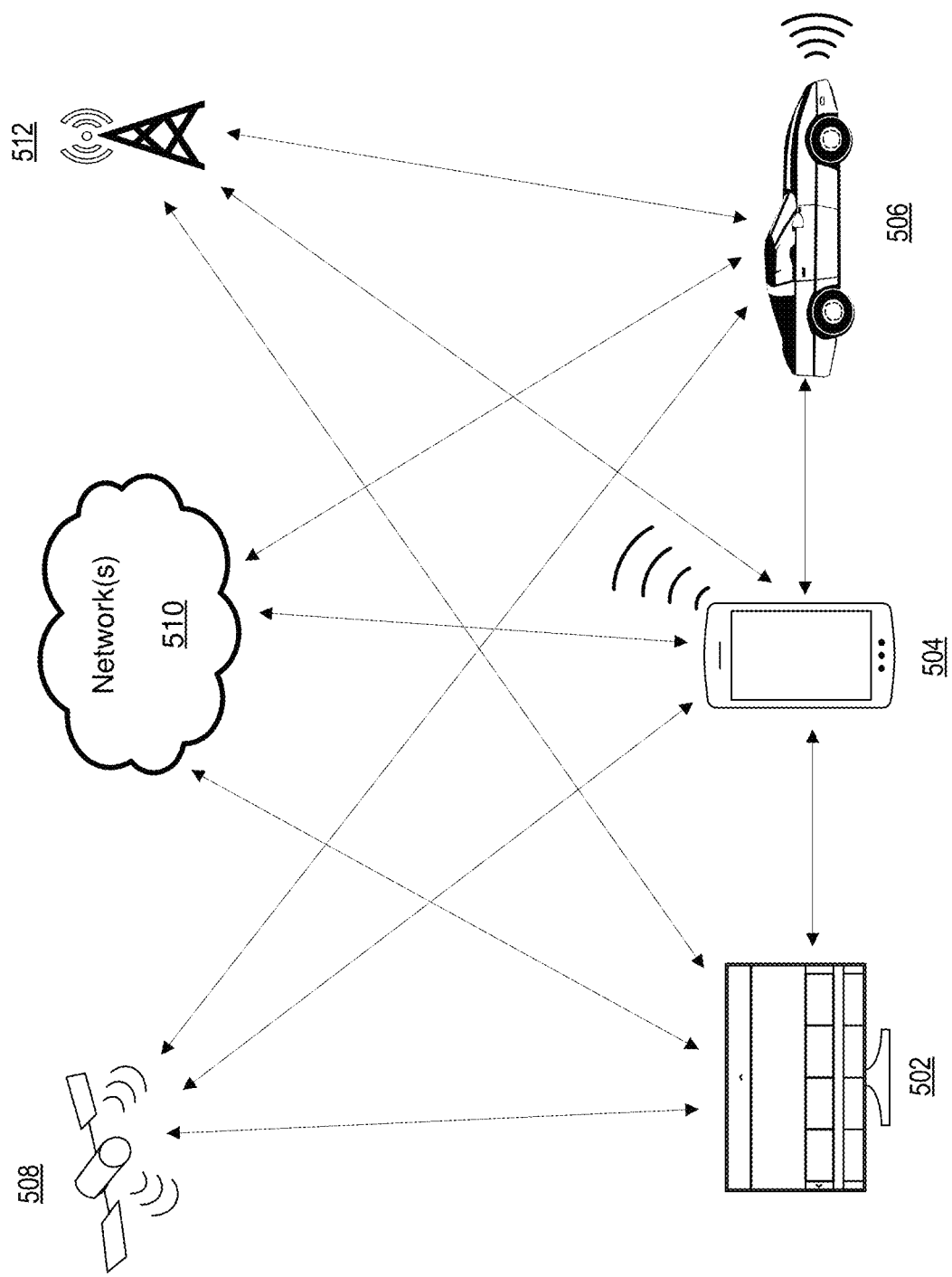
FIG. 5 illustrates example scenarios of multimodal transfer between audio and video items among a plurality of devices, communication methods, and network types, as described herein.

FIG. 5 illustrates example scenarios of multimodal transfer between audio and video items among a plurality of devices, communication methods, and network types, as described herein. Devices 502, 504, and 506 may communicate among a plurality of different network types and communication protocols, including but not limited to via satellite 508, cloud network(s) 510 (e.g., Wi-Fi, WiMax, Bluetooth, Bluetooth Low Energy, etc.), and/or broadcast/cellular network(s) 512. Additionally, devices 502, 504, and 506 may communicate locally with one another via short-range communication protocols and/or other proprietary communication protocols. During a multimodal transition, the systems and methods described herein are equipped to handle handoffs and handovers among different communication protocols. For instance, a transition from a first device on a cellular protocol may be able to transfer data related to a multimedia item to a second device on a Wi-Fi protocol. As described previously, the conversion to a second mode may be partially dependent upon the communication protocol and/or network upon which the receiving device is operating. For instance, if a receiving device is operating on a cellular network with low connectivity, then the second mode of the multimedia item may comprise low-resolution video and/or an audio-only mode. In some instances, the first mode and the second mode may be the same.

In other instances, the receiving device may have various constraints. The constraints may comprise software and/or hardware constraints; for instance, the receiving device may only be equipped to present visual content in 480p (e.g., instead of 4K resolution like a television device may be able to). Other constraints may be due to data plans and usage limits for a particular user. If a receiving device is nearing its data limit, the second mode of the multimedia item may be a low-data-usage mode (e.g., audio-only instead of high-quality audiovisual mode). Yet other constraints may include defects in the receiving device. For instance, if a device has a broken screen or an error with its speaker output, then the second mode of the multimedia item may be configured to address those constraints of the receiving device.

As described previously, the systems and methods herein may utilize at least one machine-learning model to determine when a user may initiate a multimodal transition between devices. Additionally, preferred setting for a multimodal transition may be learned and stored (i.e., a preferred mode). For example, a vehicular device may be equipped to present a multimedia item both audibly and visually. However, the user may frequently change the settings of the multimedia output to audio only when the user operates the vehicular device. Over time, the at least one machine learning model may learn that the user prefers that the mode of the multimedia item to be presented in the vehicular device be in an audio-only mode, even though the vehicular device may be equipped to both visually and audibly display the multimedia item. Preferred modes for particular devices, locations, and transitions may be stored according to the systems and methods described herein.

Figure 6:
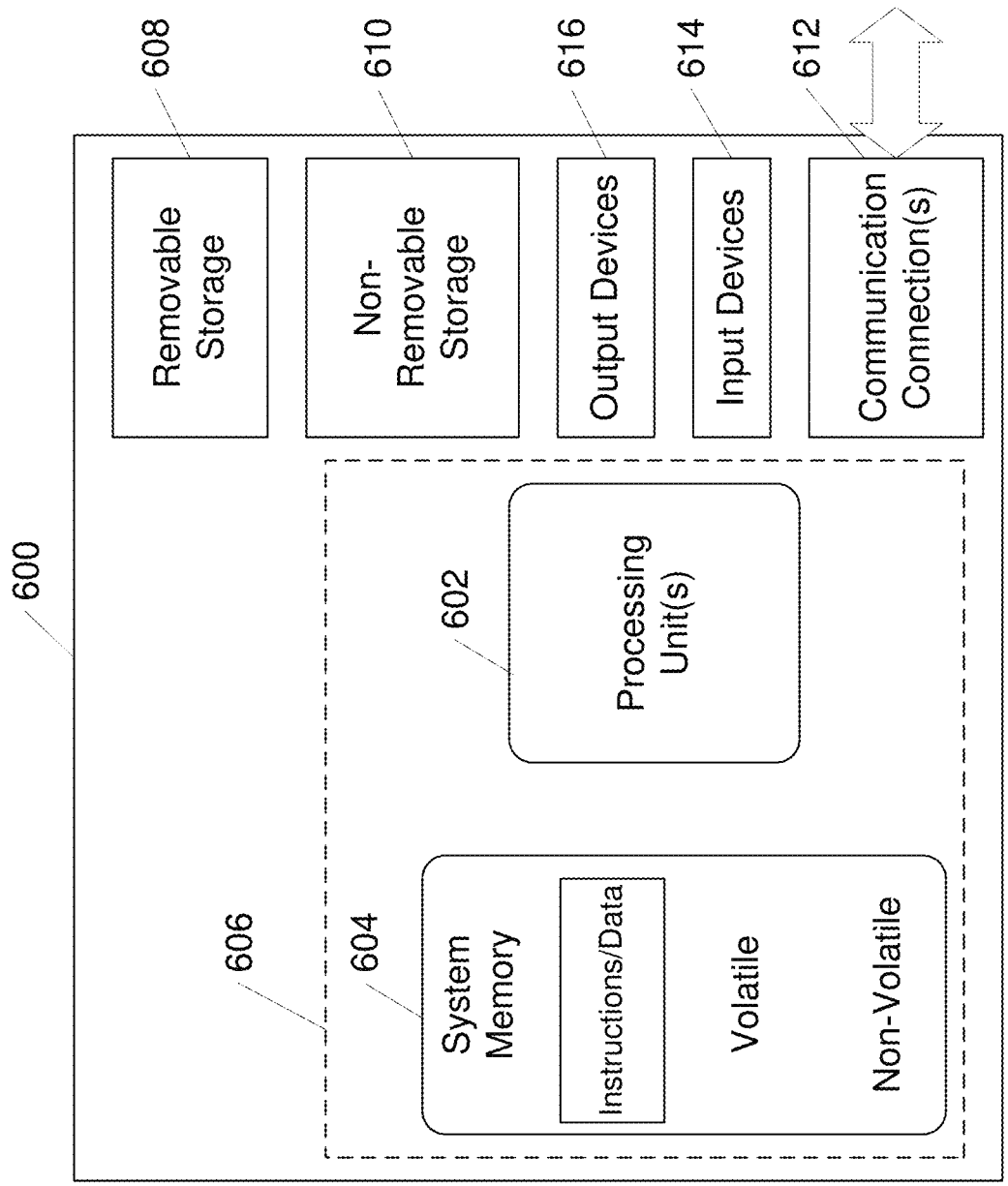
FIG. 6 illustrates one example of a suitable operating environment in which one or more of the present embodiments may be implemented.

FIG. 6 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 600 typically includes at least one processing unit 602 and memory 604. Depending on the exact configuration and type of computing device, memory 604 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 6 by dashed line 606. Further, environment 600 may also include storage devices (removable, 608, and/or non-removable, 610) including, but not limited to, magnetic or optical disks or tape. Similarly, environment 600 may also have input device(s) 614 such as keyboard, mouse, pen, voice input, etc. and/or output device(s) 616 such as a display, speakers, printer, etc. Also included in the environment may be one or more communication connections, 612, such as LAN, WAN, point to point, etc.

Operating environment 600 typically includes at least some form of computer readable media. Computer readable media can be any available media that can be accessed by processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

I claim:

1. A method for multimodal transition comprising:
receiving on a device a multimedia item in a first mode in a first location;
sensing a movement of the device from the first location to a second location;
analyzing the multimedia item in the first mode;
applying at least one machine-learning model, wherein the at least one machine-learning model is trained on at least one dataset associated with at least one pattern of behavior, wherein the at least one pattern behavior comprises the movement of the device from the first location to the second location, and wherein the at least one pattern behavior comprises a user action causing the movement of the device, and wherein the movement of the device results in a multimedia transition event for the multimedia item, wherein the multimedia transition event includes continuing the presentation by displaying the multimedia item in a second device different from the device, wherein the device is connected to a first network, and wherein the second device is connected to a second network;
analyzing the device;
based on the at least one machine-learning model, the analysis of the device, and the movement of the device from the first location to the second location, initiating a conversion of the multimedia item from the first mode to a second mode, wherein the second mode is automatically selected by the at least one machine-learning model; and
presenting the multimedia item in the second mode on the device in the second location.

2. The method of claim 1, wherein the device is at least one of: a mobile device, a laptop, a computer, a television, a pair of earphones, a pair of earbuds, a vehicle, a pair of VR/AR glasses, a head-mounted display, a smart watch, and a smart home device.

3. The method of claim 1, wherein the multimedia item is at least one of:
a video, a television show, a broadcast show, a song, a podcast, an audio file, a video file, and an audiovisual file.

4. The method of claim 1, wherein the first mode and the second mode are the same.

5. The method of claim 1, wherein analyzing the device further comprises:
analyzing at least one constraint of the device; and
analyzing at least one data plan associated with the device.

6. The method of claim 5, wherein the at least one constraint is associated with at least one of: local storage, software compatibility, a display, audio capabilities, hardware deficiencies, and network strength.

7. The method of claim 1, wherein the first mode comprises an audiovisual mode and the second mode comprises an audio-only mode.

8. The method of claim 1, wherein the at least one pattern of behavior is a temporal-based pattern.

9. The method of claim 1, wherein the at least one machine-learning model determines at least one preferred mode associated with the device based on the analysis of the device and the at least one dataset associated with the at least one pattern of behavior.

10. A system for multimodal transition comprising:
a memory storing computer readable instructions; and
a processor communicatively coupled to the memory, wherein the processor,
when executing the computer readable instructions, is configured to:
receive on a first device a multimedia item in a first mode in a first location;
sense a movement of the first device from the first location to a second location;
analyze the multimedia item in the first mode;
receive information related to a second device in the second location;
analyze the information related to the second device using at least one machine-learning model, wherein the at least one machine-learning model is trained on at least one dataset associated with at least one pattern of behavior,
wherein the at least one pattern of behavior comprises the movement of the first device from the first location to the second location, and wherein the at least one pattern behavior comprises a user action causing the movement of the first device, and wherein the movement of the first device results in a multimedia transition event for the multimedia item, wherein the multimedia transition event includes continuing the presentation by displaying the multimedia item in a second device different from the first device, wherein the first device is connected to a first network, and wherein the second device is connected to a second network;
based on the at least one machine-learning model, the analysis of the information related to the second device, and the movement of the first device from the first location to the second location, initiate a conversion of the multimedia item from the first mode to a second mode, wherein the second mode is automatically selected by the at least one machine-learning model;
transmit the converted multimedia item in the second mode to the second device in the second location; and
present the multimedia item in the second mode on the second device in the second location.

11. The system of claim 10, wherein the first mode is an audiovisual mode and the second mode is an audio-only mode.

12. The system of claim 10, wherein the processor is further configured to transmit the data according to at least one of the following: a wireless protocol, a broadband protocol, a broadcast signal, a cellular protocol, a satellite signal, a short-range signal, Wi-Fi, Bluetooth, Bluetooth Low Energy, WiMax, 4G, 5G, LTE, Zigbee, Z-Wave, and Thread.

13. The system of claim 10, wherein the at least one pattern of behavior is a temporal-based pattern.

14. The system of claim 13, wherein the temporal-based pattern is associated with the first device and the second device.

15. The system of claim 14, wherein the temporal-based pattern associated with the first device and the second device is associated with at least one of: a GPS location, a gyroscope indication, and a calendar event.

16. The system of claim 10, wherein the conversion of the multimedia item into a second mode is further based on at least one calendar event.

17. The system of claim 10, wherein the processor is further configured to: determine at least one preferred mode of playing the multimedia item based on the at least one machine-learning model.

18. The system of claim 10, the processor further configured to: after converting the multimedia item into the second mode, automatically initiate a download request of the multimedia item in the second mode onto the second device.

19. The system of claim 10, the system further configured to:
after the transmission of the converted multimedia item in the second mode to the second device, compress the converted multimedia item according to at least one compression algorithm.

20. A non-transitory computer-readable media storing computer executable instructions that when executed cause a computing system to perform a method for multimodal transition comprising:
receiving on a first device a multimedia item in a first mode in a first location;
sensing a movement of the device from the first location to a second location;
analyzing the multimedia item in the first mode;
applying at least one machine-learning model, wherein the at least one machine-learning model is trained on at least one dataset associated with at least one temporal pattern of behavior, wherein the at least one temporal pattern of behavior comprises historical temporal data associated with the movement of the device from the first location to a second location, and wherein the at least one pattern behavior comprises a user action causing the movement of the device, and wherein the movement of the device results in a multimedia transition event for the multimedia item, wherein the multimedia transition event includes continuing the presentation by displaying the multimedia item in a second device different from the first device, wherein the first device is connected to a first network, and wherein the second device is connected to a second network;
receiving information related to a second device, wherein the information is based on the at least one machine learning model and wherein the information comprises a GPS location of the second device indicating the second location;
analyzing the information related to the second device;
based on the at least one machine-learning model, the analysis of the information related to the second device, and the analysis of the multimedia item in the first mode, initiating a conversion of the multimedia item from the first mode to the second mode, wherein the second mode is automatically selected by the at least one machine-learning model;
compressing the converted multimedia item in the second mode according to at least one compression algorithm; and transmitting the compressed converted multimedia item in the second mode to the second device.

* * * * *

UNITED STATES PATENT AND TRADEMARK OFFICE
CERTIFICATE OF CORRECTION

| | | |
|---|---|---|
| PATENT NO. | : 12,058,194 B2 | Page 1 of 1 |
| APPLICATION NO. | : 16/854493 | |
| DATED | : August 6, 2024 | |
| INVENTOR(S) | : Seth VanSickel | |

It is certified that error appears in the above-identified patent and that said Letters Patent is hereby corrected as shown below:

In the Claims

Column 14 Claim 1, Line 25, after "one" delete "pattern behavior" and insert --pattern of behavior--

Column 14 Claim 1, Line 28 after "one" delete "pattern behavior" and insert --pattern of behavior--

Column 15 Claim 10, Lines 32 and 33, after "one" delete "pattern behavior" and insert --pattern of behavior--

Column 16 Claim 20, Line 43, after "one" delete "pattern behavior" and insert --pattern of behavior--

Signed and Sealed this
Tenth Day of September, 2024

Katherine Kelly Vidal
*Director of the United States Patent and Trademark Office*